United States Patent
Ni et al.

(10) Patent No.: US 11,666,070 B2
(45) Date of Patent: Jun. 6, 2023

(54) BEE BREAD CONTAINING ASTAXANTHIN AND HYDROPHILIC COLLOID AND PREPARATION METHOD THEREOF

(71) Applicant: JIMEI UNIVERSITY, Xiamen (CN)

(72) Inventors: Hui Ni, Xiamen (CN); Liangzhen Zhang, Xiamen (CN); Yuanfan Yang, Xiamen (CN); Shutai Zhang, Xiamen (CN); Ling Wu, Xiamen (CN); Yanhong Chen, Xiamen (CN); Xiping Du, Xiamen (CN); Lijun Li, Xiamen (CN); Huinong Cai, Xiamen (CN)

(73) Assignee: JIMEI UNIVERSITY, Xiamen (CN)

( * ) Notice: Subject to any disclaimer, the term of this patent is extended or adjusted under 35 U.S.C. 154(b) by 500 days.

(21) Appl. No.: 16/616,446

(22) PCT Filed: Feb. 6, 2018

(86) PCT No.: PCT/CN2018/075349
§ 371 (c)(1),
(2) Date: Nov. 22, 2019

(87) PCT Pub. No.: WO2018/214596
PCT Pub. Date: Nov. 29, 2018

(65) Prior Publication Data
US 2020/0138057 A1    May 7, 2020

(30) Foreign Application Priority Data
May 23, 2017 (CN) .......................... 201710367687.6

(51) Int. Cl.
*A23K 50/90* (2016.01)
*A23K 20/121* (2016.01)
*A23K 20/163* (2016.01)
*A23K 10/12* (2016.01)
*A23K 10/30* (2016.01)

(52) U.S. Cl.
CPC ............ *A23K 20/121* (2016.05); *A23K 10/12* (2016.05); *A23K 10/30* (2016.05); *A23K 20/163* (2016.05); *A23K 50/90* (2016.05)

(58) Field of Classification Search
CPC .... A23K 50/90; A23K 20/121; A23K 20/163; A23K 10/12; A23K 10/30
See application file for complete search history.

(56) References Cited

U.S. PATENT DOCUMENTS

| | | | |
|---|---|---|---|
| 2006/0148378 A1* | 7/2006 | Cohen | A23K 50/90 449/2 |
| 2006/0217445 A1* | 9/2006 | Chew | A61K 31/015 514/690 |

FOREIGN PATENT DOCUMENTS

| | | | | |
|---|---|---|---|---|
| CN | 1038573 | A | | 1/1990 |
| CN | 1488282 | A | | 4/2004 |
| CN | 101626695 | A | | 1/2010 |
| CN | 102356821 | A | | 2/2012 |
| CN | 104812909 | A | | 7/2015 |
| CN | 106260793 | A | * | 1/2017 |
| CN | 106260793 | A | | 1/2017 |
| CN | 107156545 | A | | 9/2017 |
| KR | 900003015 | B1 | | 5/1990 |
| KR | 1648436 | B1 | * | 8/2016 ............. A23K 10/16 |
| WO | WO-2017085477 | A1 | * | 5/2017 ........... A23K 20/105 |

OTHER PUBLICATIONS

Premratanachai et al., Review of the anticancer activities of bee products, Asian Pac J Trap Biomed 2014; 4(5): 337-344. (Year: 2014).*
Xiao Li, Effect of Different Protein Source on the Reproductive Effects and the Quality of Royal Jelly for Honeybee (*Apis mellifera* L.), Chinese Master's Theses Full-text Database Agriculture Science and Technology, Jan. 15, 2015.

* cited by examiner

*Primary Examiner* — W A Moore
(74) *Attorney, Agent, or Firm* — Bayramoglu Law Offices LLC

(57) ABSTRACT

A bee bread containing a base material of the bee bread, the hydrophilic colloid, ethanol and water, and is prepared according to a certain preparation method. The bee bread containing the astaxanthin and the hydrophilic colloid has the advantages of long preservation time and small nutrient loss. The bee which are fed with the bee bread for a long time can effectively increase the yield of royal jelly and the number of larvae, and extend the life.

10 Claims, No Drawings

BEE BREAD CONTAINING ASTAXANTHIN AND HYDROPHILIC COLLOID AND PREPARATION METHOD THEREOF

CROSS REFERENCE TO THE RELATED APPLICATIONS

This application is the national phase entry of International Application No. PCT/CN2018/075349, filed on Feb. 6, 2018, which is based upon and claims priority to Chinese Patent Application No. 201710367687.6, filed on May 23, 2017, the entire contents of which are incorporated herein by reference.

TECHNICAL FIELD

The present invention relates to the field of artificial breeding feed, and specifically relates to a bee bread containing astaxanthin and hydrophilic colloid and a preparation method therefor.

BACKGROUND

The natural bee bread is a solid that is generated through crunching, spitting and wetting, microbial fermentation and brewing after the bee collects pollinarium and stores the pollinarium in a honeycomb, and can be stored for a long time and is rich in various amino acids, minerals, vitamins and other components, and is the main source of protein for bees.

Due to natural factor, human factor, bee colony and other factors, the bee bread stored in the bee colony is often inadequate, resulting in decline in the yield of bee royal jelly, the number of larvae and the life. In order to supplement the inadequacy of the bee protein, the bees are often fed with the pollen or artificial bee bread in the bee feeding process, to make up the influence brought by the inadequacy of the natural bee bread. It has been found from the relevant reports that the raw materials such as fermented soybean meal, low-level pollen, etc. can be used as artificial bee bread or pollen substitute, and the formula of the artificial bee bread is deeply researched. However, since the sources of the raw materials are different, especially after a bean product is adopted as raw material of the bee bread of the bee, the yield of bee royal jelly, the number of larvae, the life and others are influenced to some degree.

SUMMARY

The purpose of the present invention is to overcome the defects of the prior art and provide a bee bread that is rich in nutrients, has long shelf life, can meet the requirement for bee protein, and is beneficial to increasing the yield of bee royal jelly and the number of larvae and extending the life.

To achieve the above purpose, the present invention adopts the following technical solution:

A bee bread containing astaxanthin and hydrophilic colloid is composed of the following components:

base material of bee bread, astaxanthin, hydrophilic colloid, ethanol and water.

Further, the base material of the bee bread contains 50% of pollen and 50% of fermented soybean meal.

Further, a preparation method for the base material of the bee bread is specifically crushing the dry pollen and passing through a screen of 120 meshes; after the soybean meal is fermented by *bacillus*, drying, crushing and passing through the screen of 120 meshes; and uniformly mixing the pollen with the fermented soybean meal at a ratio of 1:1 as a standby.

Further, the hydrophilic colloid is xanthan gum, gelatin, carrageenan, pectin, Arabic gum or guar gum.

A preparation method for the bee bread containing the astaxanthin and the hydrophilic colloid comprises the following specific steps:

S1. crushing a certain amount of base material of the bee bread as a standby;

S2. weighing and taking a certain mass of astaxanthin, to cause the mass ratio of the base material of the bee bread to the astaxanthin to be 100:0.2-0.6;

S3. preparing the ethanol aqueous solution with the concentration of 50-100%;

S4. uniformly mixing the above astaxanthin with a certain mass of ethanol aqueous solution, to prepare the astaxanthin-ethanol solution;

S5. uniformly mixing the astaxanthin-ethanol solution with the base material of the bee bread, to obtain a mixture of the astaxanthin and the base material of the bee bread;

S6. preparing hydrophilic colloid aqueous solution with the concentration of 0.05%-0.1%, adding the certain mass of the hydrophilic colloid aqueous solution to the mixture of the astaxanthin and the base material of the bee bread in step 5, and mixing uniformly; and S7. placing the mixture prepared in step S6 at the temperature of 50° C. and drying, and then crushing, to obtain a bee bread containing astaxanthin and hydrophilic colloid.

Further, in step S4, the mass of the ethanol aqueous solution satisfies that the mass ratio of the base material of the bee bread to the ethanol aqueous solution is 100: 20-100.

Further, in step S6, the mass of the hydrophilic colloid aqueous solution satisfies that the mass ratio of the base material of the bee bread to the hydrophilic colloid aqueous solution is 100: 20-40.

After the above technical solution is adopted, compared with the background, the present invention has the following advantages: since the hydrophilic colloid is added to the present invention, the astaxanthin is closely combined with the base material of the bee bread, to prevent uneven layering and protect the present invention from oxidation. The present invention containing astaxanthin prepared by the method can be preserved for long time and can be preserved for 12 months, and the loss rate is less than 15%; Compared with the bee that is fed with the base material of the bee bread that does not add astaxanthin, the bee that is fed with the bee bread can effectively increase the yield of royal jelly and the number of larvae, and extend the life of the bee.

DETAILED DESCRIPTION OF THE EMBODIMENTS

Embodiment 1

(1) weighing and taking 1000 g of base material of the bee bread, and crushing as a standby, and then weighing and taking 5 g of astaxanthin;

(2) uniformly mixing the above astaxanthin with 800 g of ethanol aqueous solution with the concentration of 90%, to prepare the astaxanthin-ethanol solution;

(3) uniformly mixing the astaxanthin-ethanol solution with the crushed base material of the bee bread, to obtain a mixture of the astaxanthin and the base material of the bee bread;

(4) preparing xanthan gum aqueous solution with the concentration of 0.1%, and taking 400 g of the xanthan gum aqueous solution and adding to the mixture of the astaxanthin and the base material of the bee bread, and mixing uniformly; and (5) placing the mixture in (4) at the temperature of 50° C. and drying, and then crushing, to obtain a bee bread containing astaxanthin and hydrophilic colloid.

The bee bread is preserved at room temperature for 12 months, and the loss rate of the astaxanthin is 12.5%; Compared with a colony of bees that are fed with the base material of the bee bread, a colony of bees that are fed with the bee bread containing 0.5% of astaxanthin in the present invention increase the yield of royal jelly by 17%; increase the number of capping larvae by 28%; and extend the life of worker bees by 31%.

To make the purpose, the technical solution and the advantages of the present invention more clear, the present invention will be further described below in detail in combination with the embodiments. It should be understood that specific embodiments described herein are only used for explaining the present invention, not used for limiting the present invention.

Embodiment 2

(1) weighing and taking 1000 g of base material of the bee bread, and crushing as a standby, and then weighing and taking 2 g of astaxanthin;

(2) uniformly mixing the above astaxanthin with 200 g of ethanol aqueous solution with the concentration of 100%, to prepare the astaxanthin-ethanol solution;

(3) uniformly mixing the astaxanthin-ethanol solution with the crushed base material of the bee bread, to obtain a mixture of the astaxanthin and the base material of the bee bread;

(4) preparing xanthan gum aqueous solution with the concentration of 0.05%, and taking 200 g of the xanthan gum aqueous solution and adding to the mixture of the astaxanthin and the base material of the bee bread, and mixing uniformly; and (5) placing the mixture in (4) at the temperature of 50° C. and drying, and then crushing, to obtain a bee bread containing astaxanthin and hydrophilic colloid.

The bee bread is preserved at room temperature for 12 months, and the loss rate of the astaxanthin is less than 10%; Compared with a colony of bees that are fed with the base material of the bee bread, a colony of bees that are fed with the artificial bee bread containing 0.2% of astaxanthin in the present invention increase the yield of the royal jelly by 10.7%; increase the number of capping larvae by 15%; and extend the life of worker bees by 15%.

Embodiment 3

(1) weighing and taking 1000 g of base material of the bee bread, and crushing as a standby, and then weighing and taking 4 g of astaxanthin;

(2) uniformly mixing the above astaxanthin with 400 g of ethanol aqueous solution with the concentration of 80%, to prepare the astaxanthin-ethanol solution;

(3) uniformly mixing the astaxanthin-ethanol solution with the crushed base material of the bee bread, to obtain a mixture of the astaxanthin and the base material of the bee bread;

(4) preparing xanthan gum aqueous solution with the concentration of 0.08%, and taking 300 g of the xanthan gum aqueous solution and adding to the mixture of the astaxanthin and the base material of the bee bread, and mixing uniformly; and (5) placing the mixture in (4) at the temperature of 50° C. and drying, and then crushing, to obtain a bee bread containing astaxanthin and hydrophilic colloid.

The bee bread is preserved at room temperature for 12 months, and the loss rate of the astaxanthin is less than 8%; Compared with a colony of bees that are fed with the base material of the bee bread, a colony of bees that are fed with the artificial bee bread containing 0.4% of astaxanthin in the present invention increase the yield of royal jelly by 14.8%; increase the number of capping larvae by 19%; and extend the life of worker bees by 26%.

Embodiment 4

(1) weighing and taking 1000 g of base material of the bee bread, and crushing as a standby, and then weighing and taking 6 g of astaxanthin;

(2) uniformly mixing the above astaxanthin with 1000 g of ethanol aqueous solution with the concentration of 100%, to prepare the astaxanthin-ethanol solution;

(3) uniformly mixing the astaxanthin-ethanol solution with the crushed base material of the bee bread, to obtain a mixture of the astaxanthin and the base material of the bee bread;

(4) preparing xanthan gum aqueous solution with the concentration of 0.1%, and taking 400 g of the xanthan gum aqueous solution and adding to the mixture of the astaxanthin and the base material of the bee bread, and mixing uniformly; and (5) placing the mixture in (4) at the temperature of 50° C. and drying, and then crushing, to obtain a bee bread containing astaxanthin and hydrophilic colloid.

The bee bread is preserved at room temperature for 12 months, and the loss rate of the astaxanthin is 9.8%; Compared with a colony of bees that are fed with the base material of the bee bread, a colony of bees that are fed with the bee bread containing 0.6% of astaxanthin in the present invention increase the yield of royal jelly by 18.7%; increase the number of capping larvae by 25%; and extend the life of worker bees by 29%.

Embodiment 5

(1) weighing and taking 1000 g of base material of the bee bread, and crushing as a standby, and then weighing and taking 400 g of xanthan gum aqueous solution with the concentration of 0.1%;

(2) uniformly mixing the xanthan gum aqueous solution with the base material of the bee bread;

(3) placing the mixture in (4) at the temperature of 50° C. and drying, and then crushing, to obtain a bee bread that does not contain astaxanthin but adds hydrophilic colloid.

The bee bread is preserved at room temperature for 12 months, and the no astaxanthin is detected; Compared with a colony of bees that are fed with the base material of the bee bread, a colony of bees that are fed with the bee bread have no significant change in the yield of royal jelly, the number of capping larvae and the life of the worker bee.

Embodiment 6

(1) weighing and taking 1000 g of base material of the bee bread, and crushing as a standby, and then weighing and taking 5 g of astaxanthin;

(2) dissolving the above astaxanthin in 800 g of ethanol aqueous solution with the concentration of 90%, to obtain the astaxanthin-ethanol solution;

(3) uniformly mixing the astaxanthin-ethanol solution with the base material of the bee bread;

(4) placing the mixture obtained in (3) at the temperature of 50° C. and drying, and then crushing, to obtain a bee bread that contains astaxanthin but does not contain hydrophilic colloid.

The bee bread is preserved at room temperature for 12 months, and the loss rate of the astaxanthin is 85%; Compared with a colony of bees that are fed with the base material of the bee bread, a colony of bees that are fed with the bee bread increase the yield of royal jelly by 4%; increase the number of capping larvae by 3%; and have no significant difference in the life of worker bees.

In the above embodiments 1-6, the methods for detecting the amount of astaxanthin degradation, the yield of royal jelly, the number of capping larvae and the life of the worker bees are same. That is, after the bee bread is prepared, the amount of astaxanthin degradation is determined through liquid chromatography, the bee bread is used for feeding the bees, and the yield of bee royal jelly, the number of larvae and the life of the bee are determined through random grouping experiment of large samples, wherein the yield of bee royal jelly is that a royal jelly production test is conducted on a bee which is artificially fed with a sample provided in the present invention under the condition of removing pollen, and the average output in every month is used as an evaluation index; the number of bee larvae is that a breeding test is conducted on the bee which is artificially fed with a sample provided in the present invention under the empty spleen and under the condition of removing pollen in a breeding season, and the area of the capping larvae is determined and used as the evaluation index; and the average life of the bee is that for the bee colony which are artificially fed with the sample provided in the present invention under the conditions of removing pollen and controlling a queen bee, average monthly decrement is determined to evaluate the average life.

The above is just one concrete embodiment of the present invention, but the protection scope of the present invention is not limited thereto. Any change or replacement contemplated easily by those skilled in the art familiar with the technical field within the technical scope disclosed by the present invention shall be covered within the protection scope of the present invention. Therefore, the protection scope of the present invention should be determined by the protection scope of the claims.

The bee bread containing the astaxanthin and the hydrophilic colloid and prepared by the present invention has the advantages of long preservation time and small nutrient loss. The bee which is fed the bee bread for a long time can effectively increase the yield of royal jelly and the number of larvae, and extend the life.

What is claimed is:

1. A bee bread, comprising:
   a base material of the bee bread, the base material of the bee bread contains 50% of pollen and 50% of fermented soybean meal,
   astaxanthin in an amount from 0.2 to 0.6% by weight of the base material, and hydrophilic colloid.

2. The bee bread according to claim 1, wherein the hydrophilic colloid is xanthan gum, gelatin, carrageenan, pectin, Arabic gum or guar gum.

3. The bee bread according to claim 1, wherein the fermented soybean meal has been fermented by *Bacillus*.

4. A method for preparing the bee bread of claim 1, comprising following specific steps:
   S1: crushing an amount of the base material of the bee bread;
   S2: weighing and taking a mass of astaxanthin, wherein a mass ratio of the amount of base material of the bee bread to the amount of astaxanthin is 100:0.2-0.6;
   S3: preparing an ethanol aqueous solution with a concentration of 50-100%;
   S4: uniformly mixing the mass of astaxanthin with the ethanol aqueous solution, to prepare an astaxanthin-ethanol solution;
   S5: uniformly mixing the astaxanthin-ethanol solution with the base material of the bee bread, to obtain a mixture of the astaxanthin and the base material of the bee bread;
   S6: preparing an amount of hydrophilic colloid aqueous solution with a concentration of 0.05%-0.1%, adding the amount of hydrophilic colloid aqueous solution to the mixture of the astaxanthin and the base material of the bee bread obtained from step S5, and mixing uniformly; and
   S7: placing the mixture prepared in the step S6 at the temperature of 50° C. and drying, and then crushing, to obtain the bee bread.

5. The method for preparing the bee bread according to claim 4, wherein in step S4, a mass ratio of the amount of base material of the bee bread to the ethanol aqueous solution is 100: 20-100.

6. The method for preparing the bee bread according to claim 4, wherein in step S6, a mass ratio of the amount of base material of the bee bread to the amount of hydrophilic colloid aqueous solution is 100: 20-40.

7. The method for preparing the bee bread according to claim 4, wherein a preparation method for the base material of the bee bread comprises: crushing dry pollen and passing through a screen of 120 meshes, thereby producing a crushed and screened dry pollen; after soybean meal is fermented by *Bacillus*, drying, crushing and passing through the screen of 120 meshes, thereby producing a crushed and screened dry fermented soybean meal; and uniformly mixing the crushed and screened dry pollen with the crushed and screened dry fermented soybean meal at a ratio of 1:1.

8. A bee bread consisting of:
   a base material of the bee bread, the base material of the bee bread contains 50% of pollen and 50% of fermented soybean meal,
   astaxanthin in an amount from 0.2 to 0.6% by weight of the base material,
   hydrophilic colloid, and
   optionally water and/or ethanol.

9. The bee bread of claim 8, wherein the colloid is xanthan gum, gelatin, carrageenan, pectin, Arabic gum or guar gum.

10. The bee bread according to claim 8, wherein the fermented soybean meal has been fermented by *Bacillus*.

* * * * *